United States Patent [19]

Nakaharai

[11] Patent Number: 5,050,383
[45] Date of Patent: Sep. 24, 1991

[54] HYDRAULIC PRESSURE CONTROL VALVE

[75] Inventor: Ken Nakaharai, Yokosuka, Japan

[73] Assignee: Nippon Air Brake Co., Ltd., Hyogo, Japan

[21] Appl. No.: 475,712

[22] Filed: Feb. 6, 1990

[30] Foreign Application Priority Data

Feb. 14, 1989 [JP] Japan .................... 1-16152[U]

[51] Int. Cl.$^5$ .................... B60T 11/28; F15B 7/08
[52] U.S. Cl. .................... 60/589; 60/591
[58] Field of Search .......... 60/533, 562, 591, 588; 251/214, 900; 91/532

[56] References Cited

U.S. PATENT DOCUMENTS

| | | | |
|---|---|---|---|
| 3,374,868 | 3/1968 | Cumming | 60/591 X |
| 4,154,260 | 5/1979 | Shutt | 60/591 X |
| 4,213,655 | 7/1980 | Brademeyer | 60/591 X |
| 4,477,122 | 10/1984 | Hayashida | 303/9.62 |
| 4,483,145 | 11/1984 | Takeuchi et al. | 60/562 X |
| 4,595,243 | 6/1986 | Gaiser | 60/591 X |
| 4,640,554 | 2/1987 | Barr | 303/9.62 X |
| 4,669,268 | 6/1987 | Takeuchi et al. | 60/591 |
| 4,703,623 | 11/1987 | Dalibout et al. | 60/591 X |
| 4,709,968 | 12/1987 | Tanaka et al. | 60/591 X |
| 4,732,002 | 3/1988 | Farr | 60/562 X |
| 4,736,989 | 4/1988 | Myers et al. | 303/9.62 |
| 4,765,590 | 8/1988 | Hayman | 251/900 X |
| 4,774,809 | 10/1988 | Hayashida et al. | 60/591 |
| 4,809,505 | 3/1989 | Kamemoto et al. | 60/591 |
| 4,833,885 | 5/1989 | Fulmer | 60/562 X |
| 4,893,878 | 1/1990 | Cole et al. | 60/591 X |

Primary Examiner—Edward K. Look
Assistant Examiner—John Rzynic
Attorney, Agent, or Firm—Kane Dalsimer Sullivan Kurucz Levy Eisele and Richard

[57] ABSTRACT

In a hydraulic pressure control valve for use with a master cylinder, a valve chamber is formed at an attaching section of a valve body. An annular recess is formed in the valve body at a location of an end of the stepped bore, which opens to the valve chamber. A valve element is arranged within the valve chamber for movement therewithin. The valve element has a stud which extends to an interior of the master cylinder and which receives, from the piston within the master cylinder, such a force as to cause the valve element to fall down. An annular preventing element is formed separately from the valve element and the valve body. The preventing element is arranged between the valve element and the end of the stepped bore, which opens to the valve chamber. The preventing element substantially covers an annular end of the annular recess, which opens to the valve chamber, for preventing a seal element from coming out of the recess, which is arranged therewithin.

18 Claims, 3 Drawing Sheets

HYDRAULIC PRESSURE CONTROL VALVE

BACKGROUND OF THE INVENTION

The present invention relates to hydraulic pressure control valves which are mounted respectively to discharge sections of respective brake master cylinders for automotive vehicles and, more particularly, to a hydraulic pressure control valve in which a control action of the control valve is released by utilization of excessive movement of a piston within the master cylinder when malfunction occurs in one of dual brake systems.

A hydraulic pressure control valve of the kind referred to above is known from, for example, Japanese Patent Provisional Publication No. SHO 60-226347 (corres. to European Patent Application No. 0 157 158A2). The known hydraulic pressure control valve comprises a valve body whose one end is mounted to a discharge section of a master cylinder. A valve element is arranged within the valve body and has a stud which projects outwardly from the one end of the valve body. The valve element is seated against a valve seat formed in an end of a stepped piston which is arranged within the valve body. An O-ring seal element is arranged within an annular recess formed in the valve body at a location of the end of the stepped bore, for sealing between the valve body and an outer peripheral surface of the stepped piston.

Since the seal element is merely received in the annular recess, the seal element tends to be disengaged from or to come out of the annular recess by reciprocal movement of the stepped piston, at operations such as vacuum bleeding and the like. If the seal element comes out of the annular recess, the sealing between the valve body and the outer periphery of the stepped piston is lost.

In connection with the above, the aforesaid EP 0 157 158A2 discloses an annular axial projection which is provided on the valve element at a location of an end thereof, which faces toward the valve seat. The annular axial projection extends axially of the valve element toward the seal element. The annular axial projection is effective in prevention of the seal element from coming out of the annular recess. Prior to incorporation of the hydraulic pressure control valve into the master cylinder, however, the valve element tends to laterally fall down considerably. Thus, it cannot be expected for the annular axial projection to prevent the seal element from coming out of the annular recess.

Further, as disclosed in Japanese Utility Model Provisional Publication No. SHO 63-61373, an annular lateral projection is provided on the valve body at a location of an end of the annular recess, which opens to a valve chamber defined at the one end of the valve body. The annular lateral projection extends radially inwardly from the valve body toward the end of the stepped piston at which the valve seat is formed. The annular axial projection is effective in prevention of the seal element from coming out of the annular recess. However, the annular lateral projection makes it difficult to insert the seal element into the annular recess. In order to facilitate incorporation of the valve element into the annular recess, the annular end of the annular recess, which opens to the valve chamber, must have a sufficient space by means of, for example, taper means.

Furthermore, since the stud of the valve element considerably projects or protrudes outwardly from the one end of the valve body, there is the following problem, prior to the control valve being incorporated in the master cylinder. That is, when the hydraulic pressure control valve is handled for inspection of a control characteristic of the hydraulic pressure control valve, for packing the same, or the like, there may be such a fear that the projecting stud on the valve element is abutted against another member so that the valve element is tilted or falls down. If the tilting or falling-down of the valve member is excessive, the valve element moves beyond a step at an outer peripheral edge of the valve seat so that the valve element is fitted into the annular recess located radially outwardly of the step. Thus, there may be a case where the valve element cannot be returned to its regular or right posture. If it is not known that the valve element is fitted into the annular recess and if the hydraulic pressure control valve is incorporated in the master cylinder as it is, there is such a fear that the valve element is damaged, particularly, in case where the valve element is made of plastic material, the valve element is broken.

In view of the above problem, the applicant of this invention has proposed, in Japanese Utility Model Application No. SHO 63-112031, such a technique that a cap member for restricting movement of the valve element is mounted to the one end of the valve body thereby preventing the valve element from falling down excessively and thereby previously avoiding damage on the valve element.

However, subsequent consideration indicates the fact that, in case where the cap member is made of plastic material which is easy in manufacturing, the cap member per se is moved easily by an external force. Thus, there may be a case where it is impossible to surely prevent the valve element from falling down excessively.

SUMMARY OF THE INVENTION

It is therefore an object of the invention to provide a hydraulic pressure control valve capable of preventing seal means from coming out of an annular recess formed in a valve body.

It is another object of the invention to provide a hydraulic pressure control valve capable of preventing a valve element from falling down excessively.

It is still another object of the invention to provide a hydraulic pressure control valve which is superior in assembling.

For the purpose, according to the invention, there is provided a hydraulic pressure control valve for use with a master cylinder having a piston therewithin, the master cylinder having a discharge section for hydraulic fluid, the hydraulic pressure control valve comprising:

a valve body having, at one end thereof, an attaching section for the discharge section of the master cylinder and, at the other end, a piping connecting section;

a valve chamber formed in the attaching section of the valve body and opening to the discharge section of the master cylinder;

a stepped bore formed in the valve body for communication between the valve chamber and the piping connecting section of the valve body;

an annular recess formed in the valve body at a location of an end of the stepped bore, which opens to the valve chamber;

a stepped piston arranged within the stepped bore for sliding movement therealong, the stepped piston being formed therein with a communication bore for communication between the valve chamber and the piping connecting section of the valve body;

preload spring means arranged within the valve body for biasing the stepped piston toward the piping connecting section of the valve body;

a valve seat formed in the stepped piston at a location of an end of the communication bore therein, which opens to the valve chamber;

a valve element arranged within the valve chamber for movement therewithin, in facing relation to the valve seat, the valve element having stud means which extends to an interior of the master cylinder and which receives, from the piston within the master cylinder, such a force as to cause the valve element to fall down;

valve spring means arranged within the valve chamber for biasing the valve element so as to be seated against the valve seat;

seal means arranged within the annular recess for sealing between the stepped piston and the valve body; and annular preventing means formed separately from the valve element and the valve body, the annular preventing means being arranged between the valve element and the end of the stepped bore, which opens to the valve chamber, the annular preventing means substantially covering an annular end of the annular recess, which opens to the valve chamber, for preventing the seal means from coming out of the annular recess.

With the arrangement of the invention, it is ensured that the seal means is prevented from coming out of the annular recess by the annular preventing means, even prior to incorporation of the hydraulic pressure control valve into the master cylinder. Further, it is made easy to incorporate the seal means into the annular recess. Thus, it is ensured that the seal means is received in the annular recess to seal between the valve body and an outer peripheral surface of the stepped piston.

Preferably, the above-described hydraulic pressure control valve further includes restricting means arranged within the valve chamber and extending from the annular preventing means toward an end of the valve chamber, which opens to the discharge section of the master cylinder, for restricting movement of the valve element within the valve chamber, to a predetermined range.

With the above arrangement of the invention, the movement of the valve element is restricted by the restricting means. Accordingly, the valve element can always be maintained in its regular posture. In other words, the valve element can be prevented from being falling down. Thus, the valve element can be prevented from being damaged.

Preferably, the annular preventing means and the restricting means cooperate with each other to form a single integral tubular member which has, at its one end, a flange serving as the annular preventing means, and a tubular peripheral-wall section serving as the restricting means, the flange extending radially inwardly from one end of the tubular peripheral-wall section.

With the above arrangement of the invention, since the tubular member is a single component, the hydraulic pressure control valve is extremely superior also in assembling.

DETAILED DESCRIPTION

Figure 1:
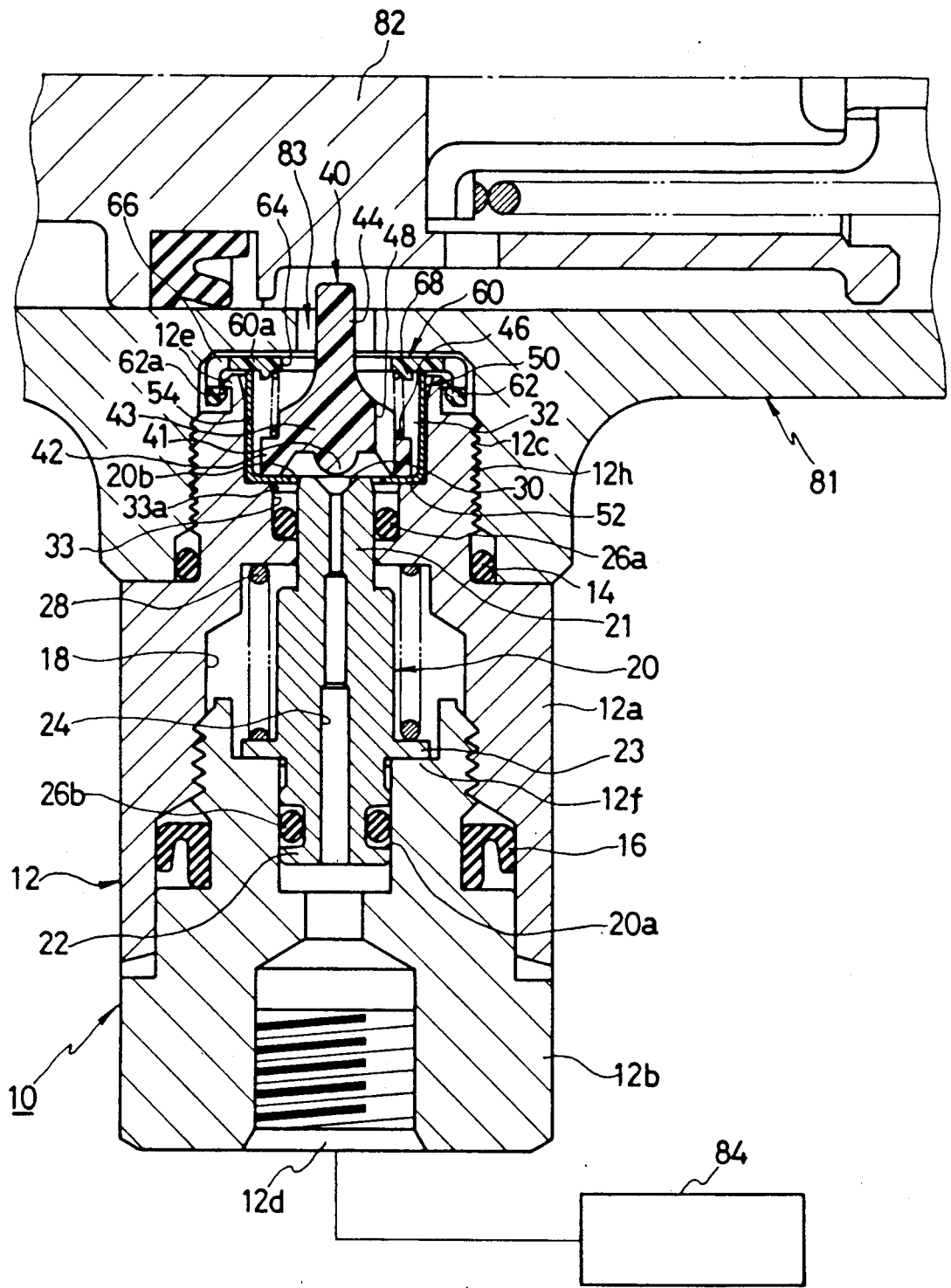
FIG. 1 is a longitudinal cross-sectional view of a hydraulic pressure control valve according to a first embodiment of the invention.

Referring to FIG. 1, there is shown a hydraulic pressure control valve, generally designated by the reference numeral 10, according to a first embodiment of the invention. The hydraulic pressure control valve 10 is for use with a master cylinder 81 for an automotive vehicle. The master cylinder 81 has therewithin a piston 82 and has a discharge section 83 for hydraulic fluid or liquid.

The hydraulic presure control valve 10 comprises a valve body 12 which is made of metal. The valve body 12 has, at one end thereof, an attaching section 12h for mounting to the discharge section 83 of the master cylinder 81 and, at the other end, a piping connecting section 12d for connection to a wheel cylinder (not shown) of a brake device 84. The valve body 12 is composed of a pair of members 12a and 12b which are threadedly engaged with each other. It is of course that the valve body 12 may be of one-piece structure. One of the pair of members 12a, which is located at the one end of the valve body 12, has the attaching section 12h which is provided, at its outer periphery, with male threads 12c. The other member 12b is formed, at the other end of the valve body 12, with the piping connecting section 12d.

An O-ring seal element 14 arranged at the outer periphery of the attaching section 12h serves to maintain sealing between the master cylinder 81 and the valve body 12. A lip-seal element 16 is arranged between the pair of members 12a and 12b to maintain sealing therebetween.

The valve body 12 is provided therein with a bore 18 extending from an end of the attaching section 12h, which faces toward the discharge section 83 of the master cylinder 81. The bore 18 extends to the other end of the valve body 12, at which the piping connecting section 12d is located. The bore 18 is a stepped bore, and a stepped piston 20 is inserted in the stepped bore 18 for sliding movement therealong. The stepped piston 20 has, at its one end, a smaller-diameter portion 21 and, at its other end, a larger-diameter portion 22. The stepped piston 20 further has an annular flange 23 between the smaller-diameter and larger-diameter portions 21 and 22. The stepped piston 20 is provided therein with a communication bore 24 extending from the one and other ends of the stepped piston 20 in concentric relation to the stepped bore 18. The communication bore 24 causes the discharge section 83 of the master cylinder 81 to communicate with the piping connecting section 12d of the valve body 12. In other words, the stepped piston 20 is formed therein with the communication bore 24 for communication between a valve chamber 32 subsequently to be described and the piping connecting section 12d of the valve body 12.

A pair of first and second O-ring seal elements 26a and 26b at the respective smaller-diameter and larger-diameter portions 21 and 22 of the stepped piston 20 prescribe or regulate pressure-receiving areas at the respective opposite ends of the stepped piston 20. The first seal element 26a is arranged within an annular recess 33 in concentric relation thereto for sealing between the stepped piston 20 and the valve body 12. The annular recess 33 is formed in the valve body 12 in concentric relation to an axis thereof and at a location of an end of the stepped bore 18, which opens to the aforementioned valve chamber 32. The valve chamber 32 is formed in the attaching section 12h of the valve body 12 and opens to the discharge section 83 of the master cylinder 81. The stepped bore 18 is formed in the valve body 12 for communication between the valve chamber 32 and the piping connecting section 12d of the valve body 12. The second seal element 26b is arranged between the valve body 12 and the stepped piston 20 at a location adjacent the piping connecting section 12d of the valve body 12, for sealing between a peripheral wall surface of the stepped bore 18 and an outer peripheral surface of the stepped piston 20.

An annular tapered section 20b is formed in the stepped piston 20 at a location of the end thereof which faces toward the valve chamber 32. Further, an annular tapered section 33a is formed at the annular end of the annular recess 33 which opens to the valve chamber 32. The annular tapered sections 20b and 33a cooperate with each other to define an annular space which is trapezoidal in cross section, for facilitating entry of the seal element 26a into the annular space 33, specifically, for expediting assembling of the seal element 26a with the annular space 33.

The second seal element 26b for sealing the outer periphery of the larger-diameter portion 22 is arranged or set in a peripheral groove 20a which is formed in the outer periphery of the larger-diameter portion 22 and which extends peripherally thereof. Accordingly, there is no such a problem that the second seal element 26b slips out of the stepped piston 20. However, the first seal element 26a for sealing the outer periphery of the smaller-diameter portion 21 has such a problem that the first seal element 26a slips out of the stepped piston 20, i.e., comes out of the annular recess 33. The reason for this is that it is difficult to form a peripheral groove in the smaller-diameter portion 21 and that the first seal element 26a is merely received or inserted in the annular recess 33.

In the invention, in order to avoid or eliminate the problem of coming-out of the first seal element 26a, a single integral tubular member 50 is arranged within the valve chamber 32 to which an annular end of the annular recess 33 opens. The tubular member 50 is made of metal and has a tubular peripheral-wall section 54 and an annular flange 52 which extends radially inwardly from one end of the peripheral-wall section 54. The annular flange 52 is formed separately from the valve element 40 and the valve body 12. The annular flange 52 is arranged between the valve element 40 and the end of the stepped bore 18, which opens to the valve chamber. The annular flange 52 substantially covers the annular end of the annular recess, which opens to the valve chamber, for preventing the seal element 26a from coming out of the annular recess 33. The tubular peripheral-wall section 54 extends, along a peripheral wall surface of the valve chamber 32, from the annular flange 52 toward an annular end of the valve chamber 32, which opens to the discharge section 83 of the master cylinder 81. The tubular peripheral-wall section 54 serves as restricting means for restricting movement of the valve element 40 within the valve chamber 32, to a predetermined range. Thus, the above annular preventing means and the above restricting means cooperate with each other to form the single integral tubular member 50. The tubular member 50 is received in the valve chamber 32 such that the annular flange 52 of the tubular member 50 is located adjacent the annular recess 33.

A cap member 60 is arranged at an end of the attaching section 12h of the valve body 12, which is located adjacent the discharge section 83 of the master cylinder 81, for preventing the tubular member 50 from coming out of the valve chamber 32. That is, the tubular member 50 is retained within the valve chamber 32 such that an upper end of the peripheral-wall section 54 is retained by the cap member 60. The cap member 60 is made of plastic material, and has a top wall 60a and a tubular peripheral wall 62 which extends from the top wall 60a toward the attaching section 12h of the valve body 12. A plurality of claws 62a are provided at an inner periphery of an end of the tubular peripheral wall 62 of the cap member 60, which is located adjacent the attaching section 12h of the valve body 12. The valve body 12 has a plurality of projections 12e which are provided at the peripheral end of the attaching section 12h, which is located adjacent the discharge section 83 of the master cylinder 81. The claws 62a are engaged respectively with the projections 62 to fixedly mount the cap member 60 to the valve body 12.

The cap member 60 is provided therein with a central bore 64 through which a stud 44 of a poppet valve element 40 subsequently to be described extends. The central bore 64 serves as a passage for the hydraulic fluid. The cap member 60 is further provided therein with a plurality of auxiliary bores 66 which are located at conjunction between the top wall 60a and the tubular peripheral wall 62 of the cap member 60 in peripherally spaced relation to each other. A valve spring 46 in the form of a coil subsequently to be described has one end thereof which is retained by an annular projection 68 formed in an inner surface of the top wall 60a.

The above-mentioned poppet valve element 40 is arranged within the valve chamber 32 defined or surrounded by the cap member 60 and the tubular member 50, for movement within the valve chamber 32, in facing relation to a valve seat 30 subsequently to be described. The valve element 40 is a molded article made of plastic material. The valve element 40 has a semispherical valve section 41 at a lower center and an annular leg 42 surrounding the valve section 41. The leg 42 and the valve section 41 are integrated by a trunk section 43. A head section or the aforesaid stud 44 having a small diameter is connected to the trunk section 43. The stud 44 extends to an interior of the master cylinder 81 and is engageable with the piston 82 therewithin. The above-described valve spring 46 is arranged within the valve chamber 32 for biasing the valve element 40 so as to be seated against the valve seat 30, i.e. away from the cap member 60. Normally, the leg 42 is seated against an upper surface of the annular flange 52 of the tubular member 50. In this connection, the valve element 40 is formed therein with a through bore 48 which serves as a communication passage for the hydraulic fluid.

The aforementioned valve seat 30 is formed in the stepped piston 20 at a location of an annular end of the communication bore 24 therein, which opens to the valve chamber 32. The poppet valve element 40 can be seated against the valve seat 30. At the stage in which hydraulic pressure discharged from the master cylinder 81 is low, the stepped piston 20 receives a biasing force of a preload spring 28, and the flange 23 provided at an intermediate portion of the stepped piston 20 is abutted against a step 12f of the valve body 12, so that the stepped piston 20 is held stationary. Accordingly, under this condition, the valve element 40 is spaced away from the valve seat 30. When the hydraulic pressure reaches a predetermined value, however, the force acting upon the difference in area between the larger-diameter and smaller-diameter portions 22 and 21 overcomes the biasing force of the preload spring 28, so that the stepped piston 20 moves toward the valve chamber 32. By this movement, the poppet valve element 40 is seated against the valve seat 30. Thus, the known hydraulic control is effected.

Figure 2:
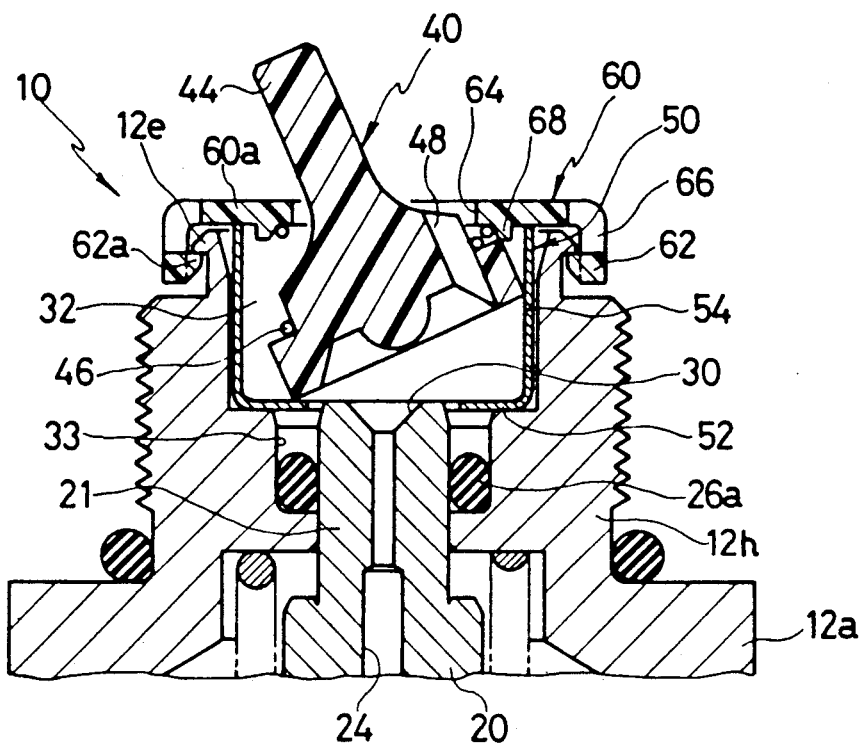
FIG. 2 is a fragmentary enlarged view of the hydraulic pressure control valve illustrated in FIG. 1, showing a valve element inclined or tilted by an external force from, for example, a piston within a master cylinder.

Further, when the piston 82 within the master cylinder 81 moves excessively due to some malfunction, the stud 44 of the valve element 40 is engaged with a flange or the like of the piston 82 within the master cylinder 81, so that the hydraulic pressure control action of the hydraulic pressure control valve 10 is released. To this end, the stud 44 of the valve element 40 considerably projects outwardly from the attaching section 12h of the valve body 12. Because of the projecting stud 44, in case where the hydraulic pressure control valve 10 is handled as a single unit, there is such a fear that another member is abutted against the projecting stud 44 so that the valve element 40 is tilted largely or excessively. As shown in FIG. 2, however, the excessive movement of the valve element 40 is restricted by the peripheral-wall section 54 of the tubular member 50. Thus, even if the valve element 40 receives such an external force as to cause the valve element 40 to fall down laterally, the latter is always returned to its normal or regular state shown in FIG. 1 without reaching the inner peripheral edge of the annular flange 52 of the tubular member 50. In this respect, the fact, that the annular flange 52 for preventing the first seal element 26a from coming out of the annular recess 33 substantially covers the annular end of the annular recess 33 which opens to the valve chamber 32, helps or aids that the posture of the valve element 40 is returned to its normal or regular state.

In connection with the above, the tubular member 50, which is arranged within the valve chamber 32 and which serves as a housing, does not move unnecessarily to impede or hinder movement of the valve element 40 even if operation and relaxation of the brake are done repeatedly. Further, since the tubular member 50 is tubular in shape and has its size or dimension suitable for the configuration of the valve chamber 32, it is possible to easily perform assembling operation of the hydraulic pressure control valve 10.

Figure 3:
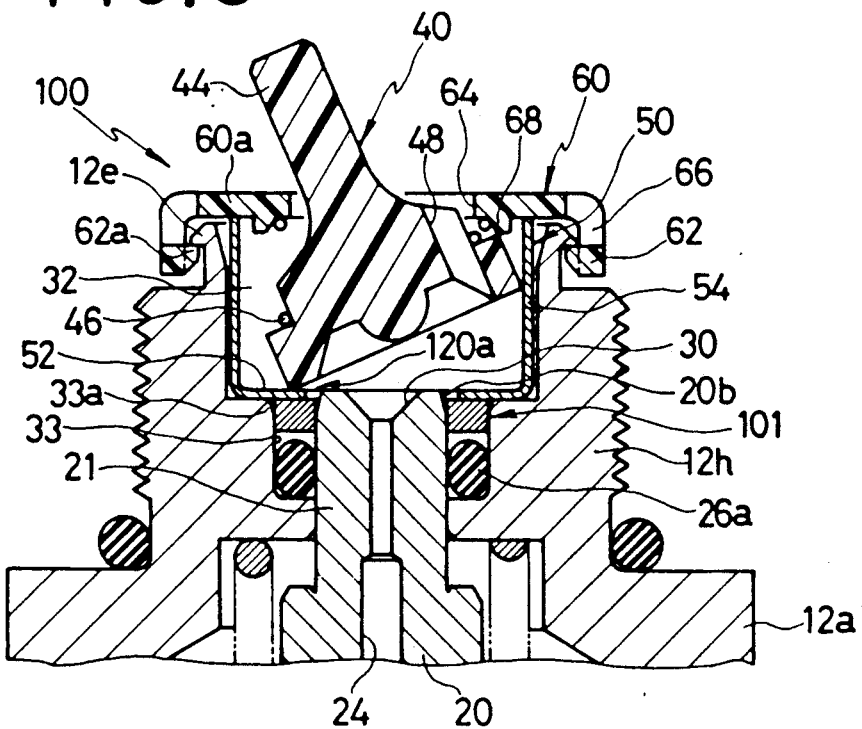
FIG. 3 is a view similar to FIG. 2, but showing a hydraulic pressure control valve according to a second embodiment of the invention.

Referring to FIG. 3, there is shown a hydraulic pressure control valve 100 according to a second embodiment of the invention. In FIG. 3, components and parts like or similar to those illustrated in FIG. 1 are designated by the same or like reference numerals, and the description of such like or similar components and parts will be omitted to avoid repetition.

As will be seen from FIG. 3, an annular spacer 101 made of resinous material is arranged within the annular recess 33 in concentric relation thereto for preventing the seal element 26a from being bitten into the annular end of the annular recess 33, which opens to the valve chamber 32. As described previously with reference to FIG. 1, the annular tapered sections 20b and 33a cooperate with each other to define the annular space which is trapezoidal in cross section, for facilitating entry of the seal element 26a into the annular space 33. Thus, the inner peripheral edge of the annular flange 52 of the tubular member 50 cooperates with the annular tapered section 120a of the stepped piston 20 to define a wedge-shaped space therebetween. The annular spacer 101 is arranged within the annular trapezoidal space to prevent the seal element 26a from being bitten into the wedge-shaped space.

Figure 4:
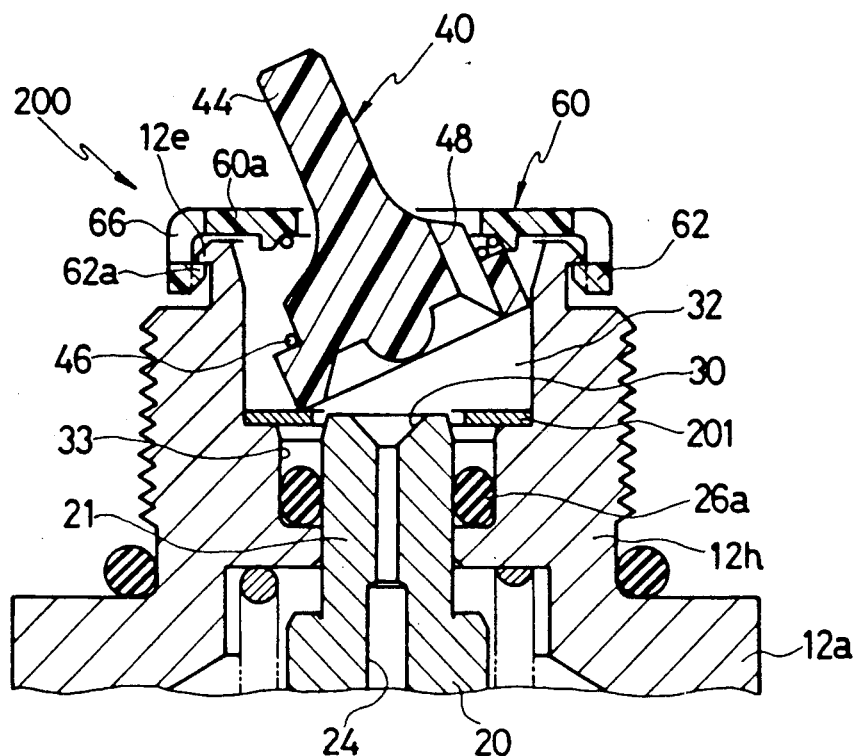
FIG. 4 is a view similar to FIG. 2, but showing a hydraulic pressure control valve according to a third embodiment of the invention.

Referring to FIG. 4, there is shown a hydraulic pressure control valve 200 according to a third embodiment of the invention. In FIG. 4, components and parts like or similar to those illustrated in FIG. 1 are designated by the same or like reference numerals, and the description of such like or similar components and parts will be omitted for simplification.

As shown in FIG. 4, the aforesaid annular preventing means for preventing the seal element 26a from coming out of the annular recess 33 is constituted by an annular disc-shaped or a ring-shaped element 201. The ring-shaped element 201 is provided, at its outer periphery, with a plurality of projections, and is force-fitted in the valve chamber 32 so as to substantially cover the annular end of the annular recess 33, which opens to the valve chamber 32. In this case, it is preferable that the inner peripheral-wall surface of the valve chamber 32 has a diameter which is so set as to prevent the valve element 40 from falling down excessively. In this connection, it is needless to say that a skirt may be provided which extends from the ring-shaped element 201 toward the cap member 60.

Figure 5:
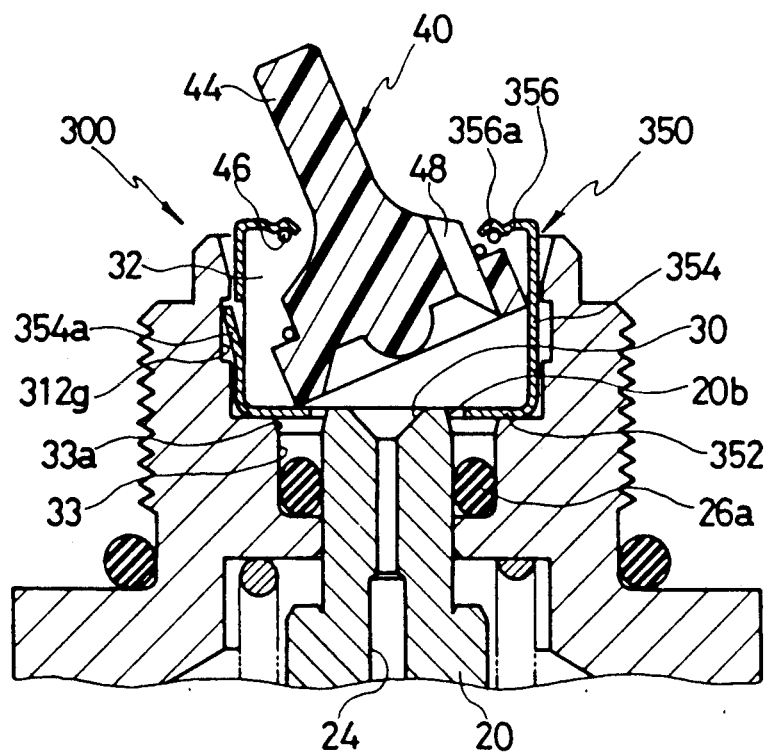
FIG. 5 is a view similar to FIG. 2, but showing a hydraulic pressure control valve according to a fourth embodiment of the invention.

Referring to FIG. 5, there is shown a hydraulic pressure control valve 300 according to a fourth embodiment of the invention. In FIG. 5, components and parts like or similar to those illustrated in FIG. 1 are designated by the same or like reference numerals, and the description of such like or similar components and parts will be omitted to avoid repetition.

As will be seen from FIG. 5, a peripheral-wall section 354 of a tubular member 350 is provided with a plurality of cut-raising pieces 354a which project radially outwardly and which are arranged in equidistantly spaced relation to each other. The peripheral wall surface of the valve chamber 32 is provided with an annular groove 312g in concentric relation to the peripheral-wall section 354. The cut-raising pieces 354a are engaged with the annular groove 312g to prevent the tubular member 350 from coming out of the valve chamber 32. That is, the tubular member 350 per se attempts its own prevention of coming-out from the valve chamber 32. For this reason, the cap member 60 of the first embodiment is dispensed with. In accordance with the omission of the cap member 60, the tubular member 350 has a second annular flange 356 which extends radially inwardly from one end of the peripheral-wall section 354, at a location opposite to an annular flange 352 for preventing the seal element 26a from coming out of the annular recess 33. The second annular flange 356 has an annular retainer section 356a for the valve spring 46. In this case, of course, the second annular flange 356 is restricted in its size or dimension, or the second annular flange 356 is formed into its configuration which is discontinuous peripherally, whereby assembling or the like of the valve element 40 can be done smoothly.

The fourth embodiment illustrated in FIG. 5 can have functional advantages similar to those obtained by the previous first embodiment illustrated in FIG. 1. Further, since the tubular member 350 is a single component and serves also as a housing for the valve element 40, it is possible to handle the hydraulic pressure control valve 300 with the valve element 40 set within the tubular member 350. Thus, incorporation or assembling of various component parts is further made easy.

In connection with the above, a plurality of cut-raising pieces may be provided on the peripheral wall surface of the valve chamber 32 in equidistantly spaced relation to each other, and a plurality of openings may be provided in the peripheral-wall section 354 of the tubular member 350 in equidistantly spaced relation to each other. In this case, the cut-raising pieces are engaged respectively with the openings. Alternatively, other projections may be substituted for the cut-raising pieces.

What is claimed is:

1. A hydraulic pressure control valve for use with a master cylinder having a piston therewithin, said master cylinder having a discharge section for hydraulic fluid, said hydraulic pressure control valve comprising:
   a valve body having, at one end thereof, an attaching section for said discharge section of said master cylinder and, at the other end, a piping connecting section;
   a valve chamber formed in said attaching section of said valve body and opening to said discharge section of said master cylinder;
   a stepped bore formed in said valve body for communication between said valve chamber and said piping connecting section of said valve body;
   an annular recess formed in said valve body at a location of an end of said stepped bore, which opens to said valve chamber;
   a stepped piston arranged within said stepped bore for sliding movement therealong, said stepped piston being formed therein with a communication bore for communication between said valve chamber and said piping connecting section of said valve body;
   preload spring means arranged within said valve body for biasing said stepped piston toward said piping connecting section of said valve body;
   a valve seat formed in said stepped piston at a location of an end of said communication bore therein, which opens to said valve chamber;
   a valve element arranged within said valve chamber for movement therewithin, in facing relation to said valve seat, said valve element having stud means which extends to an interior of said master cylinder and which receives, from said piston within said master cylinder, such a force as to cause said valve element to fall down, said valve element further including a valve section at an opposite center and a leg portion surrounding said valve section;
   valve spring means arranged within said valve chamber for biasing said valve element so as to be seated against said valve seat;
   seal means arranged within said annular recess for sealing between said stepped piston and said valve body; and
   annular preventing means formed separately from said valve element and said valve body, said annular preventing means being arranged between said valve element and the end of said stepped bore, which opens to said valve chamber, said annular preventing means substantially covering an annular end of said annular recess, which opens to said valve chamber, for preventing said seal means from coming out of said annular recess; wherein said leg portion of said valve element is normally seated against said annular preventing means; and
   restricting means arranged within said valve chamber and extending from said annular preventing means toward an end of said valve chamber, which opens to said discharge section of said master cylinder, for restricting movement of said valve element within said valve chamber, to a predetermined range;
   wherein said annular preventing means and said restricting means cooperate with each other to form a single integral tubular member which has, at its one end, a flange serving as said annular preventing means, and a tubular peripheral-wall section serving as said restricting means, said flange extending radially inwardly from one end of said tubular peripheral-wall section.

2. The hydraulic pressure control valve according to claim 1, wherein said tubular peripheral-wall section of said tubular member extends along a peripheral wall surface of said valve chamber.

3. The hydraulic pressure control valve according to claim 1, wherein said tubular member is made of metal.

4. The hydraulic pressure control valve according to claim 1, further including an annular spacer arranged within said annular recess in concentric relation thereto for preventing said seal means from being bitten into the annular end of said annular recess, which opens to said valve chamber.

5. The hydraulic pressure control valve according to claim 1, further including a cap member arranged at an end of said attaching section of said valve body, which is located adjacent said discharge section of said master cylinder, for preventing said tubular member from coming out of said valve chamber.

6. The hydraulic pressure control valve according to claim 5, wherein said cap member is provided with claw means, and said valve body has projection means provided at the end of said attaching section, which is located adjacent said discharge section of said master cylinder, said claw means being engaged with said projection means to fixedly mount said cap member to said valve body.

7. The hydraulic pressure control valve according to claim 5, wherein said cap member is made of plastic material.

8. The hydraulic pressure control valve according to claim 6, wherein said cap member has a top wall and a tubular peripheral wall extending from said top wall toward said piping connecting section of said valve body, said claw means being provided at an inner periphery of an end of said tubular peripheral wall of said cap member, which is located adjacent the other end of said valve body.

9. The hydraulic pressure control valve according to claim 5, wherein said cap member is provided therein with a central bore through which said stud means of said valve element extends.

10. The hydraulic pressure control valve according to claim 5, wherein said cap member is provided with projection means, said valve spring means having one end thereof which is retained by said projection means.

11. The hydraulic pressure control valve according to claim 1, wherein said peripheral-wall section of said tubular member is provided with one of cut-raising means and groove means, and said valve chamber has a peripheral wall surface which is provided with the other of said cut-raising means and said groove means, said cut-raising means being engaged with said groove means to prevent said tubular member from coming out of said valve chamber.

12. The hydraulic pressure control valve according to claim 1, wherein said annular preventing means is constituted by a ring-shaped element for substantially covering the annular end of said annular recess, which opens to said valve chamber.

13. The hydraulic pressure control valve according to claim 1, wherein said tubular member has, at the other end thereof, a second flange extending radially inwardly from said peripheral-wall section, said second flange having a retainer section for said valve spring means.

14. The hydraulic pressure control valve according to claim 1, further including second seal means arranged between said valve body and said stepped piston at a location adjacent said piping connecting section of said valve body, for sealing between a peripheral wall surface of said stepped bore and an outer peripheral surface of said stepped piston.

15. The hydraulic pressure control valve according to claim 1, wherein said annular end of said annular recess has a diameter which is larger than that of an end of said annular recess opposite to said annular end thereof.

16. The hydraulic pressure control valve according to claim 15, further including an annular tapered section formed in said stepped piston at a location of the end thereof which faces toward said valve chamber, and an annular tapered section formed at the annular end of said annular recess which opens to said valve chamber, said annular tapered section of said stepped piston and said annular tapered section of said annular recess cooperating with each other to define an annular space which is trapezoidal in cross-section.

17. The hydraulic pressure control valve according to claim 1, wherein said annular preventing means and said restricting means cooperate with each other to prevent said valve element from falling down and fitting into said annular recess in part.

18. The hydraulic pressure control valve according to claim 17, wherein the inner peripheral-wall surface of said valve chamber serves as said restricting means.

* * * * *